United States Patent
Watanabe et al.

(10) Patent No.: US 7,292,002 B2
(45) Date of Patent: Nov. 6, 2007

(54) CONTROL METHOD FOR TWIN SYNCHRONIZATION

(75) Inventors: Kanji Watanabe, Fukuoka (JP);
Kazuhiko Watariyou, Fukuoka (JP);
Naoto Kiyota, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/553,287

(22) PCT Filed: Apr. 20, 2004

(86) PCT No.: PCT/JP2004/005617

§ 371 (c)(1),
(2), (4) Date: Nov. 13, 2006

(87) PCT Pub. No.: WO2004/095683

PCT Pub. Date: Nov. 4, 2004

(65) Prior Publication Data

US 2007/0067052 A1 Mar. 22, 2007

(30) Foreign Application Priority Data

Apr. 22, 2003 (JP) ............................. 2003-117287

(51) Int. Cl.
*H02P 3/18* (2006.01)
(52) U.S. Cl. .................... 318/700; 318/705; 318/66; 318/41
(58) Field of Classification Search ............. 318/41, 318/66, 700, 705, 254
See application file for complete search history.

(56) References Cited

U.S. PATENT DOCUMENTS

| 4,249,704 A | * | 2/1981 | Sakaue et al. ............ 242/437.3 |
| 4,714,400 A | * | 12/1987 | Barnett et al. ............ 414/751.1 |
| 5,025,200 A | * | 6/1991 | Kurakake et al. ........... 318/569 |
| 5,477,117 A | * | 12/1995 | Saito ..................... 318/568.22 |

FOREIGN PATENT DOCUMENTS

| JP | 11-305839 A | 11/1999 |
| JP | 2001-154737 A | 6/2001 |
| JP | 2001-242937 A | 9/2001 |
| JP | 2001-353677 A | 12/2001 |
| JP | 2002-126947 A | 5/2002 |
| JP | 2003-25178 A | 1/2003 |

* cited by examiner

*Primary Examiner*—Rina Duda
(74) *Attorney, Agent, or Firm*—Sughrue Mion, PLLC

(57) ABSTRACT

In a control method for a twin synchronization in which two motors for driving two axes (moving elements 3) mechanically fastened to each other by a fastening part (a fastening jig 6) are synchronously operated, one of the two axes is operated at low speed by a position control and the other axis is allowed to freely run and follow the one axis and a return to the origin is performed. A positional deviation between the one axis and the other axis is measured at an arbitrary pitch. The positional deviation corresponding to a position where the one axis travels is stored in a data base as a function. One position command is directly distributed to the one axis as a main position command and the position command is distributed to the other axis as a position command corrected by using the function stored in the data base to perform an operation.

4 Claims, 10 Drawing Sheets

CONTROL METHOD FOR TWIN SYNCHRONIZATION

TECHNICAL FIELD

The present invention relates to an applied machine applied to a high speed positioning control for gantry type machines such as a high speed conveying machine or other machines, and more particularly to a control method for high speed and highly accurate uses.

RELATED ART

In recent years, in the high-speed and highly accurate conveying machine of an industrial machine field, what is called a gantry type machine in which two axes are synchronously operated has been introduced. When a synchronization between the axes is carried out in the gantry type machine, a high speed and highly accurate synchronous operation is hardly realized in a machine low in its rigidity and having torsion or backlash.

Usually, to reduce a deviation between the two axes, a method has been employed in which the same position command and the speed command are respectively distributed to the axes from a controller to adjust the gain of a position controlling and speed controlling loop of each axis to a high gain, an integration is utilized in the position controlling and speed controlling loop to eliminate the deviation during a control and a speed feed forward process is carried out to improve a responsiveness for each axis and reduce the deviation between the two axes (for instance, see JP-A-11-305839).

However, in the case of a gantry type machine structure, below-described problems arise.

(1) Since the two axes are mechanically fastened to each other, the machine with high rigidity that can withstand a high gain is hardly obtained.

(2) There are necessarily an installation error of the above-described machine, an attaching error of a position sensor, distortion and backlash of each axis.

(3) Although the gain is increased to reduce the deviation between the two axes, the two axes interfere with each other during a control operation and torque outputted respectively from the axes causes a disturbance to give an adverse effect to the vibration of a pedestal or accuracy.

Thus, it is an object of the present invention to provide a twin synchronization method that can avoid the above-described problems for a machine having a gantry type structure and can easily realize a high speed and highly accurate operation.

DISCLOSURE OF THE INVENTION

To achieve the above-described object, according to an aspect of the present invention, there is provided a control method for a twin synchronization in which two motors for driving two axes mechanically fastened to each other by a fastening part are synchronously operated, the control method including the steps of: operating one of the two axes at low speed by a position control and allowing the other axis to freely run and follow the one axis and perform a return to the origin; measuring a positional deviation between the one axis and the other axis at an arbitrary pitch; storing the positional deviation corresponding to a position where the one axis travels in a data base as a function; directly disturbing one position command to the one axis as a main position command; and distributing the position command to the other axis as a position command corrected by using the function stored in the data base to perform an operation.

In order to reduce the synchronization error of the two axes, it is important to firstly determine how a return to the origin operation is performed. In this case, when the return to the origin operation is firstly performed, if the two axes are electrically operated at the same time under a speed control and a position control, a motor of each axis gives a stress to a machine side. Accordingly, characteristics such as a distortion of a machine itself cannot be grasped. Therefore, in driving upon return to the origin operation, a main axis (either of the two axes may be used) is operated at low speed by controlling a position and the other axis is allowed to freely run and follow the main axis and the return to the origin operation is carried out by a single sided drive.

Originally, in the case of a mechanically and ideally fastened structure, the deviation between the two axes is to be 0 at any position. However, in an actual machine, since there are necessarily an installation error, the attaching error of a position sensor, a distortion and backlash of each axis, the deviation between the two axes necessarily arises depending on positions. Therefore, the deviation between the two axes is automatically measured at the arbitrary pitch and recorded in the data base. Also at this time, when the two axes are electrically operated at the same time under the speed control and the position control like during the return to the origin operation, the motor of each axis gives a stress to the machine side, so that the characteristics such as the distortion of the machine itself cannot be grasped. Thus, in driving during the measurement, the main axis is operated at low speed by controlling the position and the other axis is allowed to freely run and follow the main axis to measure the deviation between the two axes.

To synchronously operate the two axes, one position command is distributed to the two axes as the main position command. The main position command to be distributed is directly distributed to the first axis. The function recorded in the data base is used, the main position command is used as an input and an output thereof is used, so that the main position command–an output value of the function=the position command of the other axis (the position command to the second axis), that is, a position command to which a correction considering a torsion part is added is distributed to the other axis.

A high speed and highly accurate synchronization control that cannot be realized by a usual control system can be realized by the above-described means without receiving an adverse effect due to the rigidity or the distortion of a machine system.

Further, according to an enhancement, there is provided the control method for a twin synchronization, wherein the deviation measured at the arbitrary pitch undergoes a linear interpolating process in the function to output the obtained deviation.

Since the deviation measured at the arbitrary pitch is arbitrarily changed in accordance with a moving distance, the linear interpolating process is carried out in the function to output the obtained deviation.

Further, according to another enhancement there is provided the control method for a twin synchronization, wherein in the position command to the other axis, a travel speed is employed as a parameter to move forward the phase of a corrected value.

When the travel speed of the machine is increased, a processing time for carrying out a correction itself is undesirably delayed. Accordingly, a function for using the travel speed as the parameter to move forward or lead the phase of the corrected value is employed to perform the synchronization control.

Further, according to another aspect of the present invention, there is provided the control method for a twin synchronization, further including the steps of: detecting the position of a center of gravity of the fastening part; preparing a function for forming an inertia compensating gain of each axis by using a position signal as an input; changing the inertia compensating gain in the position of the center of gravity of the fastening part; and adding a necessary torque calculated on the basis of an acceleration obtained from the position commands of the two axes and a mass of each axis to a torque command.

When an X-axis by which a Y1 axis is fastened to a Y2 axis is movable, the position of the center of gravity of the machine moves, so that synchronization accuracy is deteriorated. To inertia-correct the deterioration of the synchronization accuracy, a position where the X-axis moves is grasped. A function for forming the inertia compensating gain Ktffx is prepared by using a position signal as an input to change the inertia compensating gain Ktffx at the position of the X-axis. An inclination is based on a change of a load applied to the axis in accordance with the change of the center of gravity.

Thus, a high speed and highly accurate synchronization control that cannot be realized by a usual control system can be realized without receiving an adverse effect due to the rigidity or the distortion of a machine system and the change of the center of gravity due to the movement of the X-axis of the fastening part.

BRIEF DESCRIPTION OF THE DRAWINGS

FIG. 1 A-C shows a structure in an embodiment of the present invention.

Figure 1A:
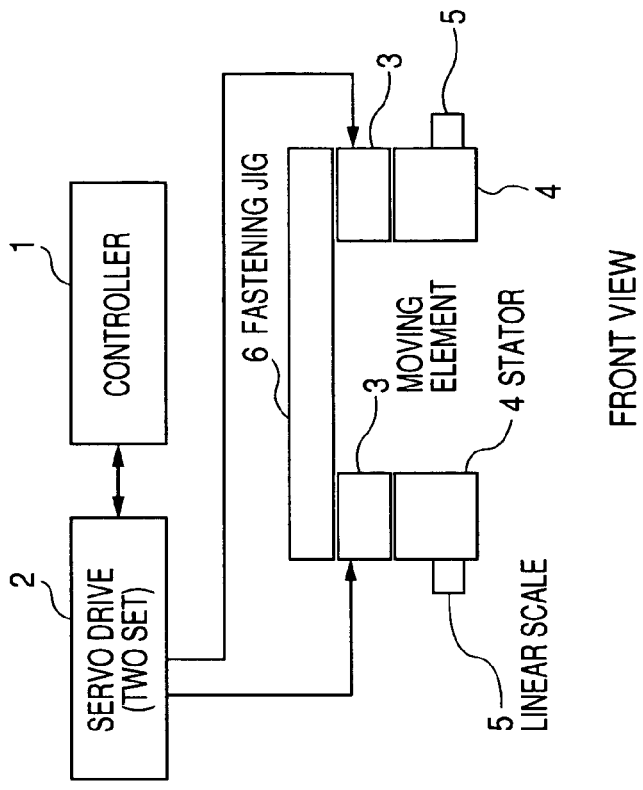
FIG. 1(A) is a front view.

In the drawings, reference numeral 1 designates a controller. 2, 2-1 and 2-2 designate servo drives. 3 designates a moving element. 4 designates a stator. 5 designates a linear scale. 6 designates a fastening jig. 7-1 designates a motor of a first axis. 7-2 designates a motor of a second axis. 11 designates a main position command generating part. 12 designates an interpolating part. 13 designates a phase lead compensating part. 14 designates a function part for generating a torsion part corrected value. 15 and 16 designate differential operating parts. 17 designates a scale converting part. 18 designates a gain amplifier. 21 designates a position loop control part. 22 designates a speed loop control part. 23 designates a current loop control part. 24 designates a linear scale. 31 designates a main position command generating part. 32 designates an interpolating part. 33 and 34 designate differential operating parts. 35 and 37 designate inertia calculating parts. 36 designates a y1-axis torque FF compensating part. 38 designates a y2-axis torque FF compensating part 39 designates an X-axis position detecting part. 40 designates a function part for generating an inertia compensating gain. 41 and 42 designate inertia compensating parts.

BEST MODE FOR CARRYING OUT THE INVENTION

Now, a first embodiment of the present invention will be described below by referring to the drawings.

Figure 1B:
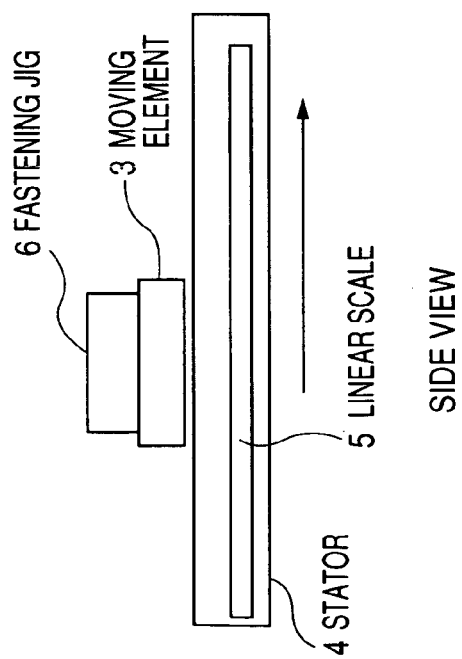
FIG. 1(B) is a side view and FIG. 1(C) is a plan view.
Figure 1C:
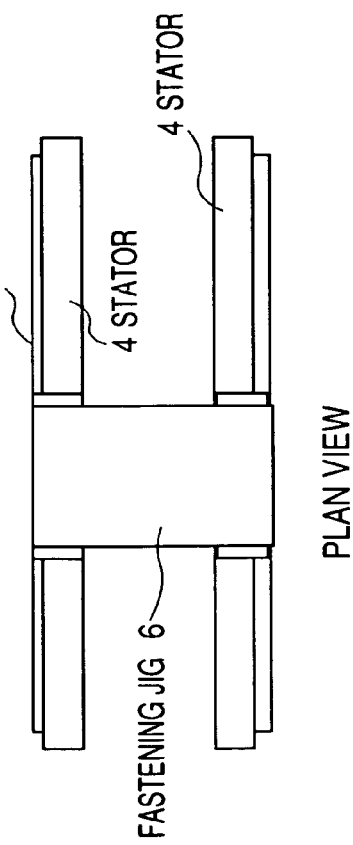

FIG. 1 shows the structure of a first embodiment of the present invention formed by using a linear motor. FIG. 1(a) is a front view, FIG. 1(b) is a side view and FIG. 1(c) is a plan view. In the drawing, reference numeral 1 designates a controller, 2 designates a servo drive, 3 designates a moving element, 4 designates a stator, 5 designates a linear scale and 6 designates a fastening jig for mechanically fastening two axes together.

Figure 2:
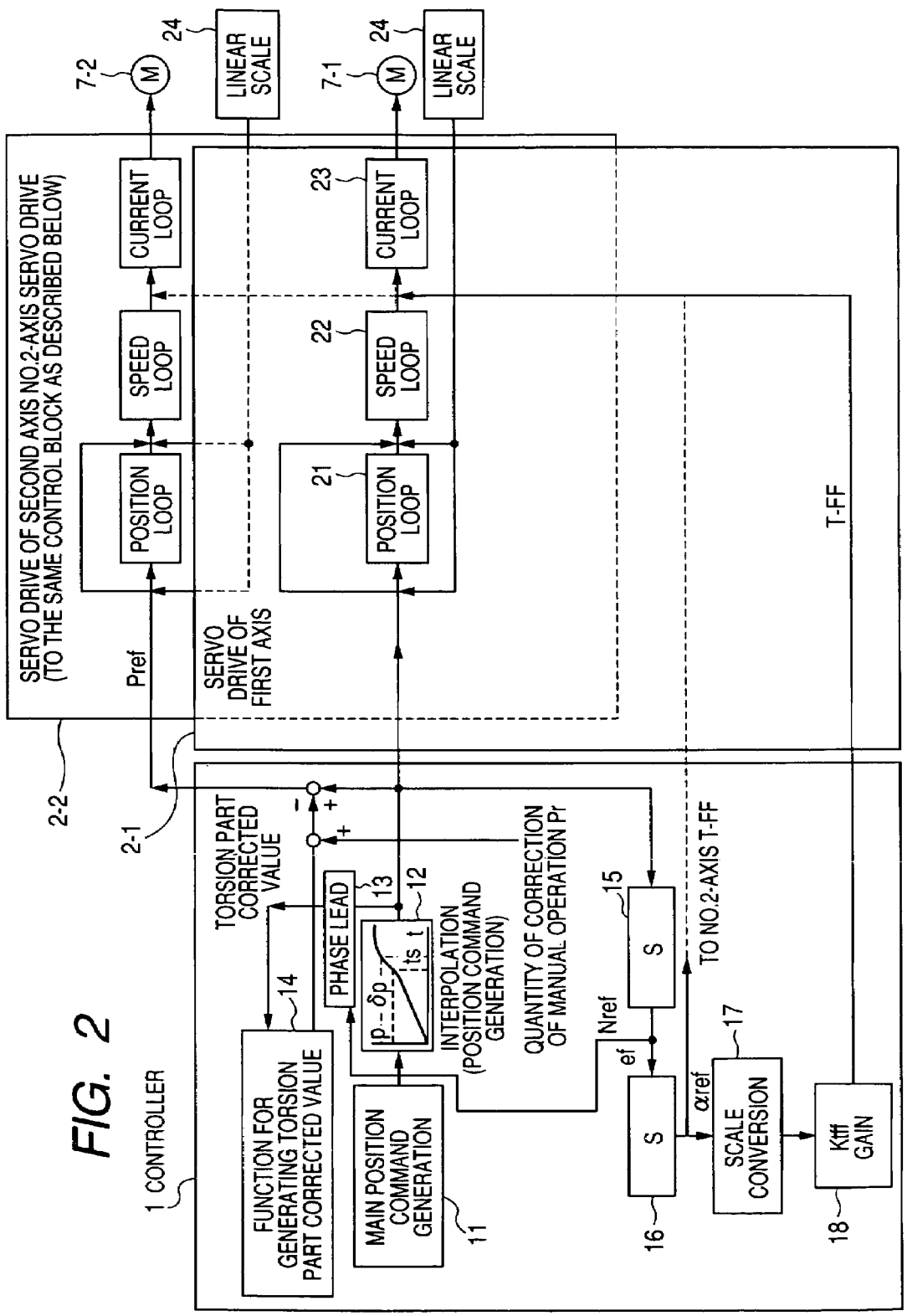
FIG. 2 is a control block diagram in a first embodiment of the present invention.

FIG. 2 is a control block diagram of this embodiment. In FIG. 2, the controller 1 includes the main position command generating part 11, the interpolating part 12, the phase lead compensating part 13, the function part 14 for generating a torsion part corrected value, the differential operating parts 15 and 16, the scale converting part 17 and the gain amplifier 18. Further, the servo drives 2-1 and 2-2 include the position loop control parts 21, the speed loop control parts 22 and the current loop control parts 23. In the drawing, 7-1 designates the motor of the first axis, 7-2 designates the motor of the second axis and 24 designates the linear scales for respectively detecting the positions of the moving elements of the motors 7-1 and 7-2.

In the control block diagram of FIG. 2, in the controller, a main position command is firstly generated by the main position command generating part 11. The main position command is interpolated in the interpolating part 12 to generate a main position command from hour to hour. To the servo drive 2-1 of the first axis, the main position command is generated for a main axis, the position command is two-stage time differentiated in the differential operating parts 15 and 16 of two stages, the differentiated position command is scale-converted in the scale converting part 17 and the converted position command is multiplied by a gain Ktff in the gain amplifier 18. Thus, T-FF (torque feed forward) is generated.

To the second servo drive 2-2 of the second axis, the position command of the main axis from hour to hour is used as an input and a torsion part correcting function generated in the function part 14 for generating a torsion part corrected value is used to generate a torsion correcting position command corresponding to the position command that passes. Thus, the main position command from hour to hour–the torsion correcting position command=a position command of the second axis is generated and outputted to the servo drive 2-2 of the second axis.

Figure 3:
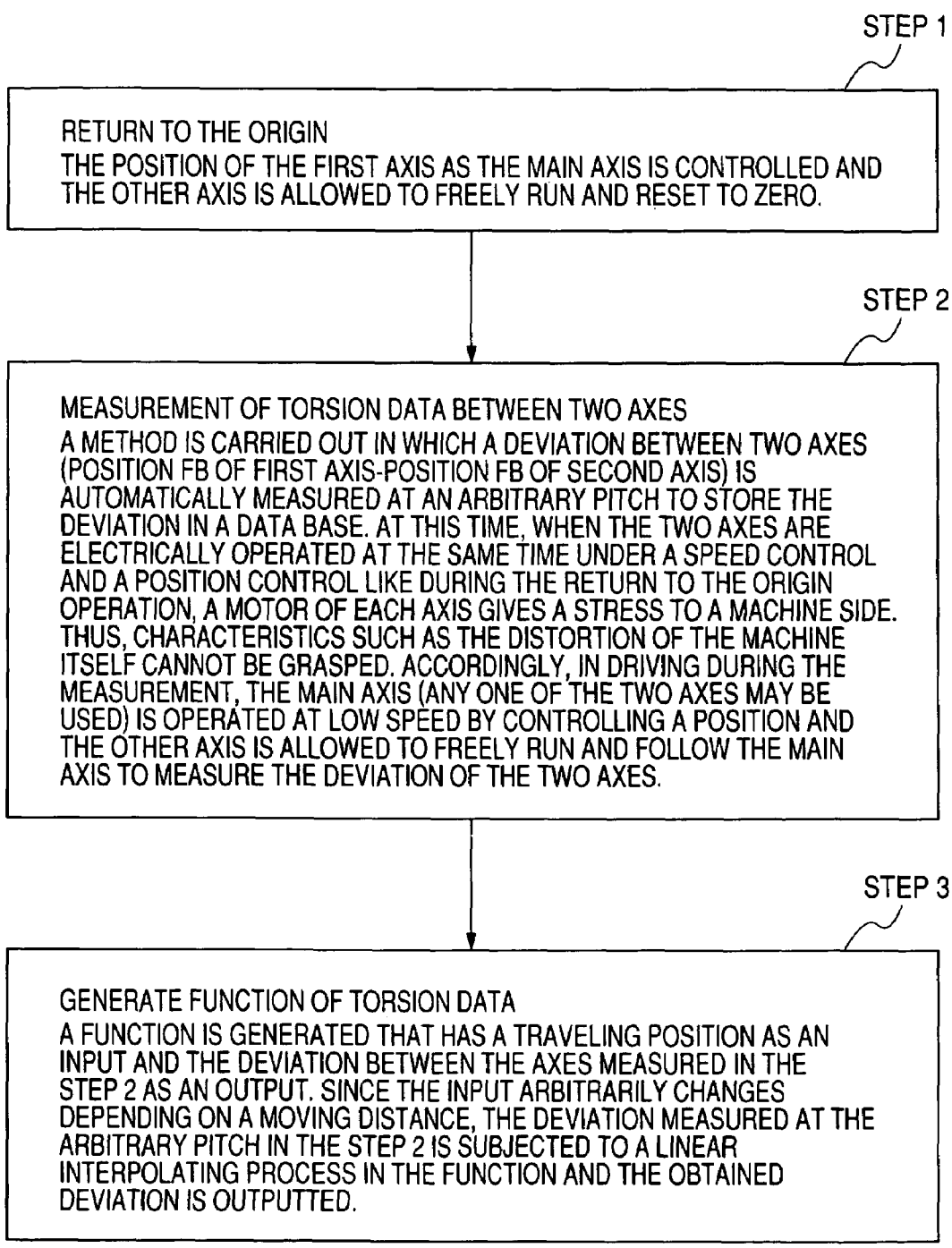
FIG. 3 is a flowchart showing a procedure for forming a torsion part correcting function in the first embodiment of the present invention.

FIG. 3 is a flowchart showing a procedure for generating a torsion part correcting function in the function part 14 for generating a torsion part corrected value.

Step 1: Return to the Origin

The position of the first axis as the main axis is controlled and the second axis as the other axis is allowed to freely run and reset to zero.

Step 2: Measurement of Torsion Data Between Two Axes

A method is carried out in which a deviation between two axes (position FB of first axis—position FB of second axis) is automatically measured at an arbitrary pitch to store the deviation in a data base. At this time, when the two axes are electrically operated at the same time under a speed control and a position control like during the return to the origin operation, a motor of each axis gives a stress to a machine side. Thus, characteristics such as the distortion of the machine itself cannot be grasped. Accordingly, in driving during the measurement, the main axis (any one of the two axes may be used) is operated at low speed by controlling a position and the other axis is allowed to freely run and follow the main axis to measure the deviation of the two axes.

Step 3: Generate Function of Torsion Data

A function is generated that has a travelling position as an input and the deviation between the axes measured in the step 2 as an output. Since the input arbitrarily changes depending on a moving distance, the deviation measured at the arbitrary pitch in the step 2 is subjected to a linear interpolating process in the function and the obtained deviation is outputted.

In order to improve the responsiveness upon acceleration and deceleration, the position commands are simultaneously outputted to the first axis and the second axis in the servo drive 2-1 and 2-2 sides. As such a synchronization control method, a position following control method in a position synchronization type speed control system disclosed in JP-A-06-28036 that is filed by the applicant of the present invention may be employed.

For a case in which a correction cannot be made only by a quantity of correction generated by an automatic measuring operation, a function for manually adding a quantity of correction as an offset value is also prepared. Further, for a case in which when the travelling speed of the machine is increased, a processing time for performing a correction itself is undesirably delayed, a function for leading the phase of a corrected value by using the travelling speed as a parameter is also prepared.

Figure 4:
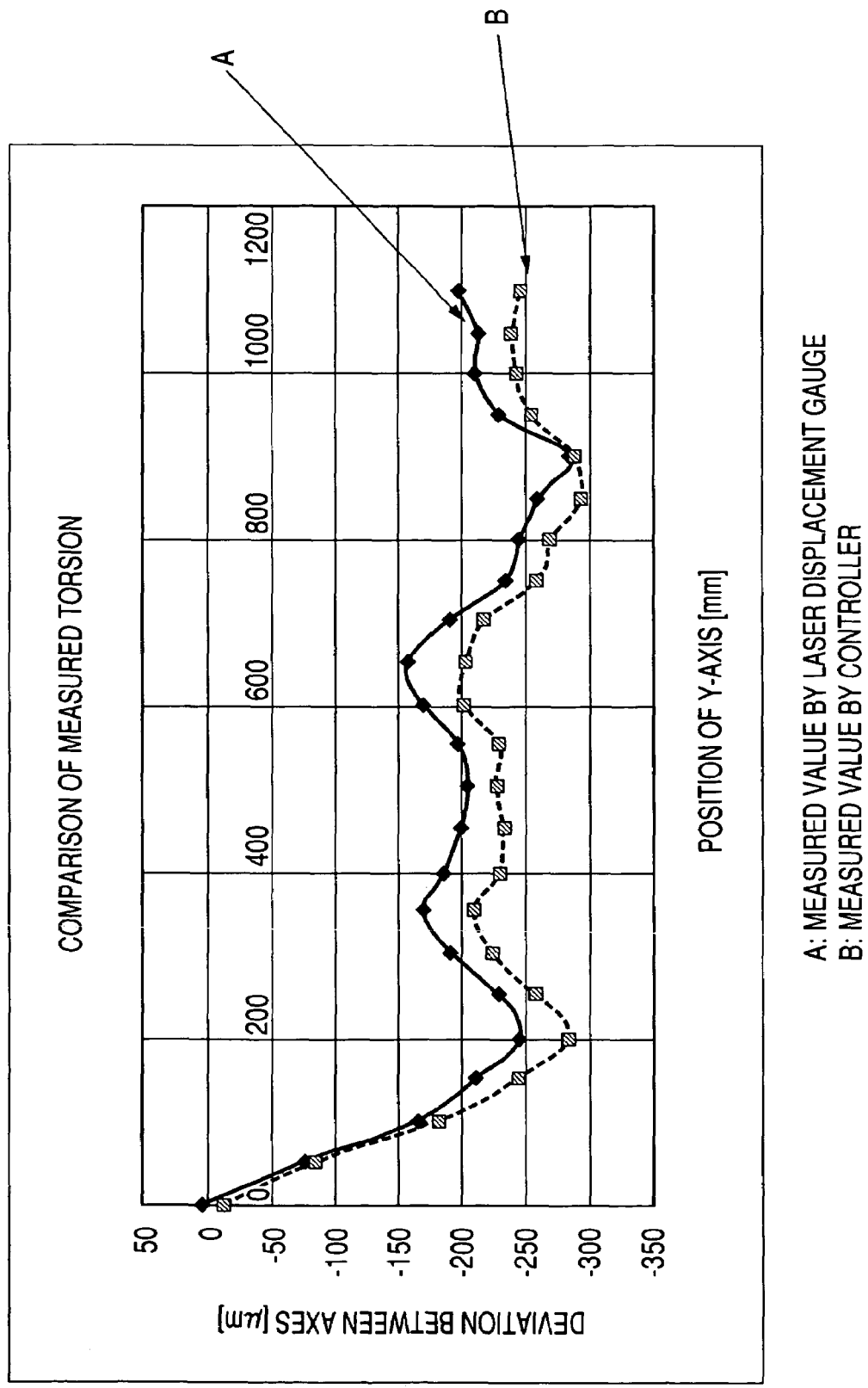
FIG. 4 is a diagram showing an output example of a torsion correcting amount in the first embodiment.

FIG. 4 is a graph showing a torsion corrected quantity specifically measured by the procedure shown in FIG. 3.

A designates a quantity of torsion measured by actually attaching a laser displacement gauge to the machine. B designates a quantity of torsion measured by the procedure shown in FIG. 3. Since the above-described offset quantity is added to the former, the quantity of torsion is the more offset for the offset quantity. However, it is understood that the quantity of torsion of the machine can be accurately measured by the method shown in FIG. 3.

Figure 5:
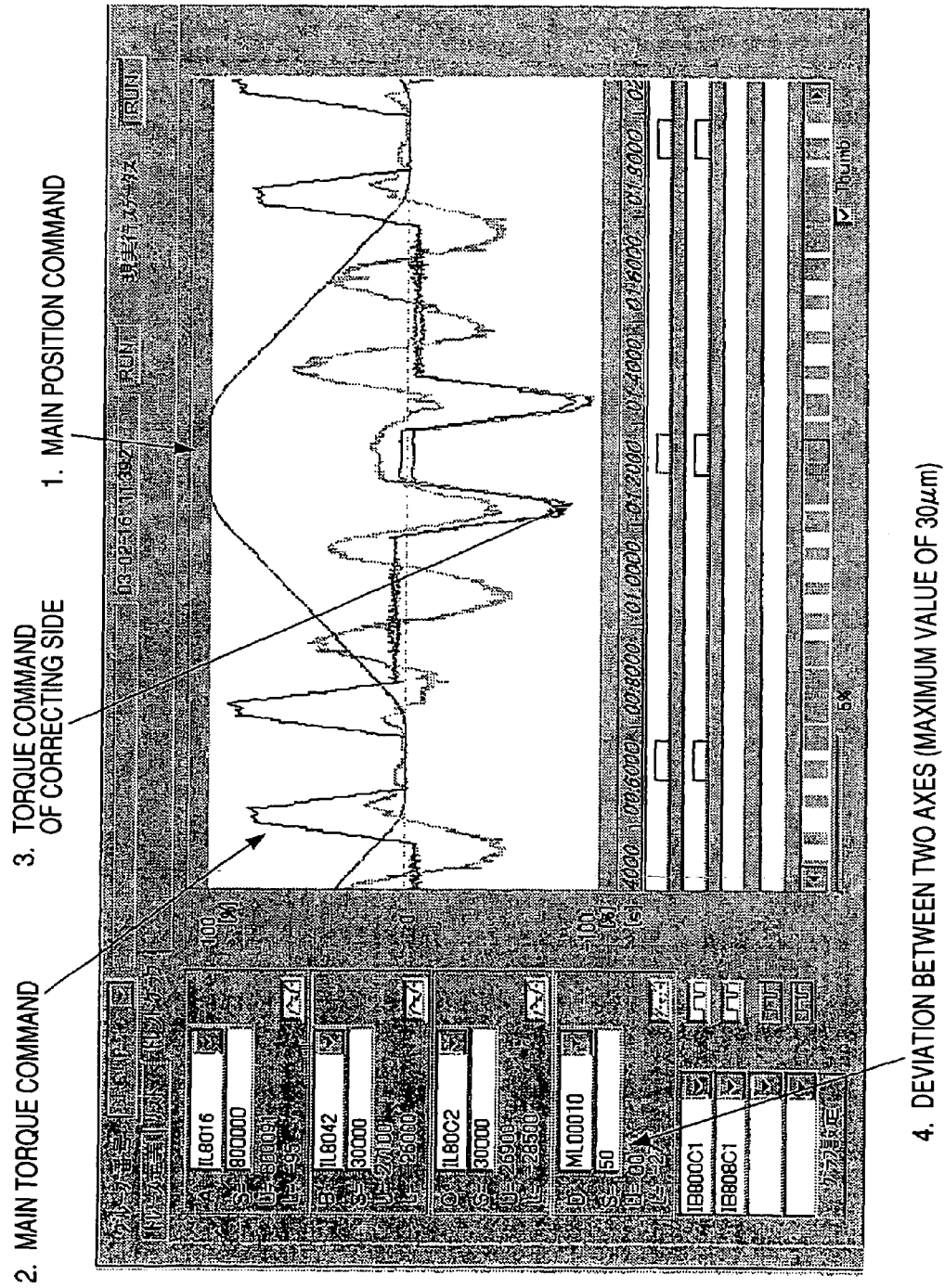
FIG. 5 is a diagram showing a relation between a main position command, a main torque command and a torque command in a correcting side when a torsion is not corrected in the first embodiment of the present invention.
Figure 6:
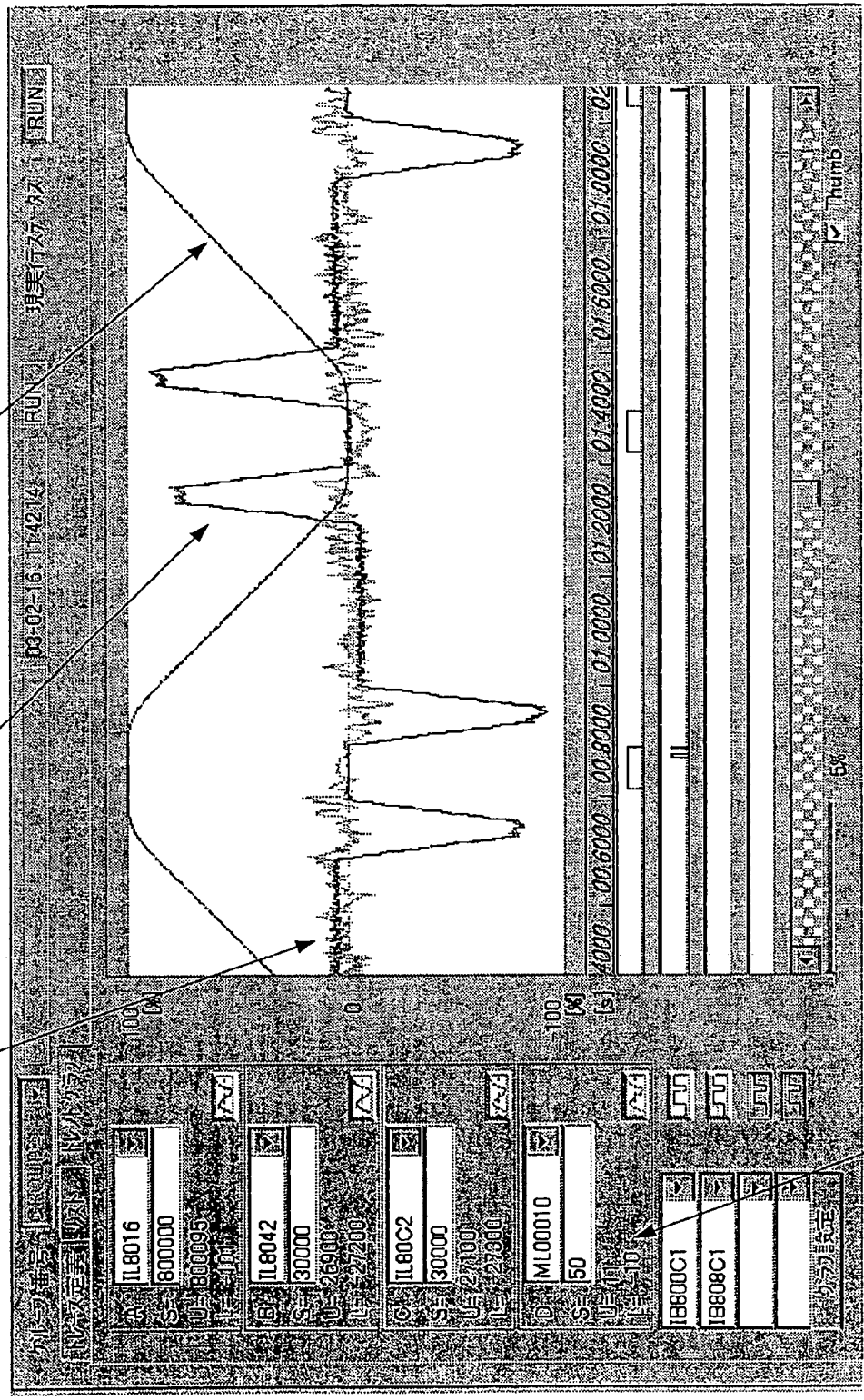
FIG. 6 is a diagram showing a relation between the main position command, the main torque command and the torque command in the correcting side when the torsion is corrected in the first embodiment of the present invention.

FIGS. 5 and 6 respectively show relations between a main position command, a main torque command and a torque command in a correcting side. FIG. 5 shows an example when a method of this embodiment is not used. FIG. 6 shows an example when the method of this embodiment is used. In FIG. 6, it is understood that the deviation between the two axes is extremely improved as high as about ⅓. As described above, the method of the present invention is used so that a synchronization control that cannot be realized hitherto can be realized in the gantry type machine using the linear motor.

Now, a second embodiment of the present invention will be described below.

Figure 7:
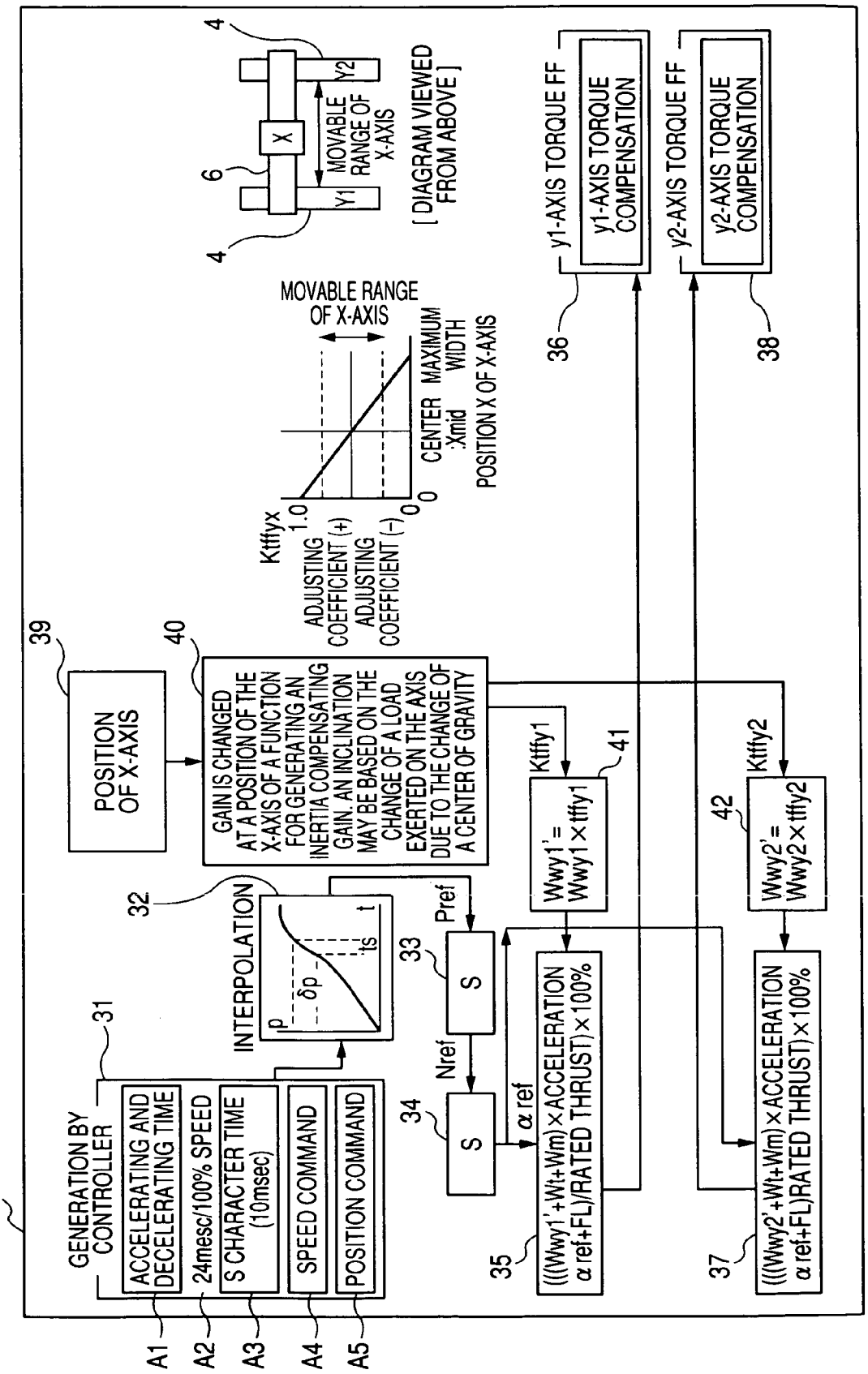
FIG. 7 is an inertia correction control block diagram in a second embodiment of the present invention.

FIG. 7 is a block diagram of a controller showing a second embodiment of the present invention.

In FIG. 7, the controller 1 includes a main position command generating part 31, an interpolating part 32, differential operating parts 33 and 34, inertia calculating parts 35 and 37, a y1-axis torque FF (feed forward) compensating part 36, a y2-axis torque FF compensating part 38, an X-axis position detecting part 39, a function part 40 for generating an inertia compensating gain and inertia compensating parts 41 and 42.

In the second embodiment, an inertia correction when an X-axis moves is controlled by a torque FF (feed forward) compensation.

In a twin synchronization type (a gantry type) machine, when a fastening jig part 6 (X-axis) moves and twin driving parts (Y1 and Y2 axes) are synchronously operated, the position of a center of gravity moves. Thus, synchronization accuracy is deteriorated.

Thus, to inertia-correct the deterioration of accuracy due to the movement of the position of a center of gravity of the machine, a position where the X-axis moves is grasped by the X-axis position detecting part 39. A position signal thereof is used as an input to prepare an inertia compensating gain Ktffx in the function part 40 for generating an inertia compensating source and change the inertia compensating gain Ktffx at the position of the X-axis (see FIG. 7(*a*)).

The inclination of the inertia compensating gain Ktffx is based on the change part of a load exerted on the axis due to the change of a center of gravity. That is, an object of the X-axis moves to change the center of gravity of the X-axis, so that the load exerted on the Y1 and Y2 changes. Accordingly, a correction is carried out only on the basis of the change part.

Figure 8:
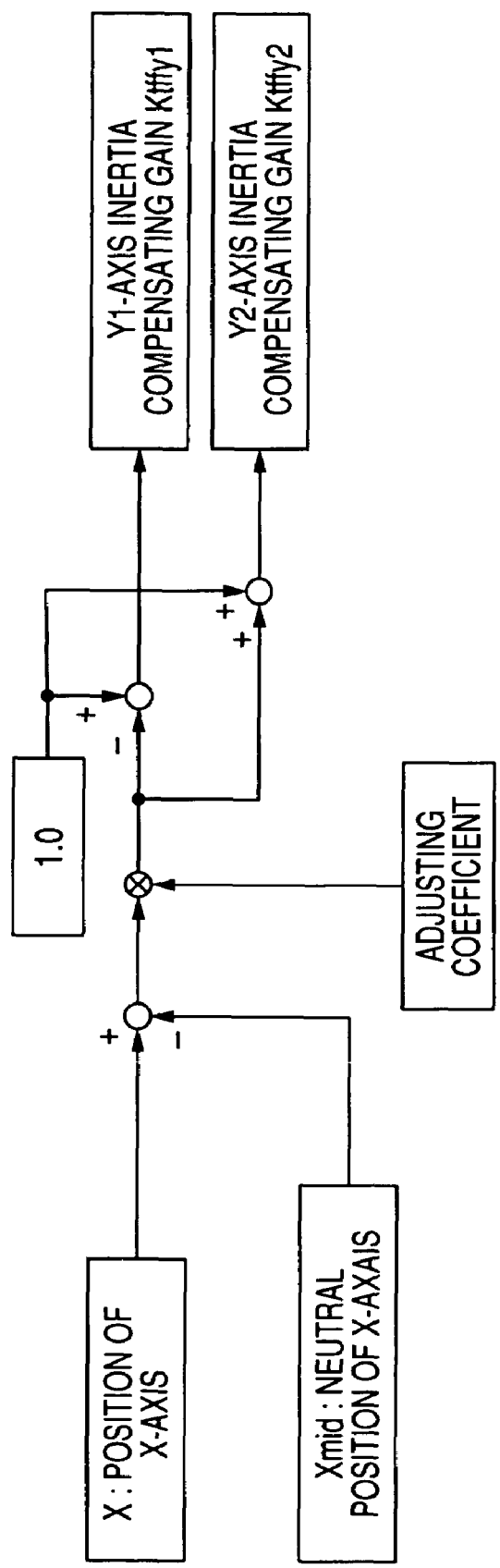
FIG. 8 is a detailed explanatory view for forming an inertial correcting gain in the second embodiment of the present invention.

As for the inclination, a neutral position of the X-axis is firstly subtracted from a current position of the X-axis. The obtained value is multiplied by an adjusting coefficient, namely, a coefficient for adjusting so that an outputted quantity of corrected torque corresponds to an actual entire torque command. To apply the inclination to the Y1 and Y2 axes in accordance with the position of the X-axis, for the Y1, the obtained value is subtracted from 1.0, and for the Y2, 1.0 is added to the obtained value, as shown in FIG. 8, so that inertia compensating coefficients Ktffy1 and Ktffy2 of the Y1 and Y2 axes are generated.

The Ktffy1 and Ktffy2 are used to calculate masses Wwy1' and Wwy2' when the X-axis moves in accordance with a following formula in the inertia compensating parts 41 and 42. Wwy1 and Wwy2 designate masses of the Y1 axis and the Y2 axis before the axes move.

$$Wwy1' = Wwy1 \times Ktffy1$$

$$Wwy2' = Wwy2 \times Ktffy2$$

An actual torque FF command is generated in the main position command generating part 31. A main position command interpolated in the interpolating part 32 is two-stage time differentiated in the differential operating parts 33 and 34 to generate an acceleration αref. In the inertia calculating parts 35 and 37, the acceleration αref, the masses Wwy1' and Wwy2 after the Y1 axis and the Y2 axis move, the mass Wt of the fastening jig 6, the mass Wm of a motor and the torque FL of the load are used to calculate a torque necessary upon operation in accordance with following formulas.

$$(((Wwy1'+Wt+Wm) \times \text{acceleration } \alpha\text{ref}+FL)/\text{rated thrust}) \times 100\%$$

$$(((Wwy2'+Wt+Wm) \times \text{acceleration } \alpha\text{ref}+FL)/\text{rated thrust}) \times 100\%$$

The torque calculated in such a way is inputted to the y1-axis torque FF compensating part 36 and the y2-axis torque FF compensating part 38 as compensating torque and added to a torque command of a driver side to improve the synchronization accuracy.

Figure 9:
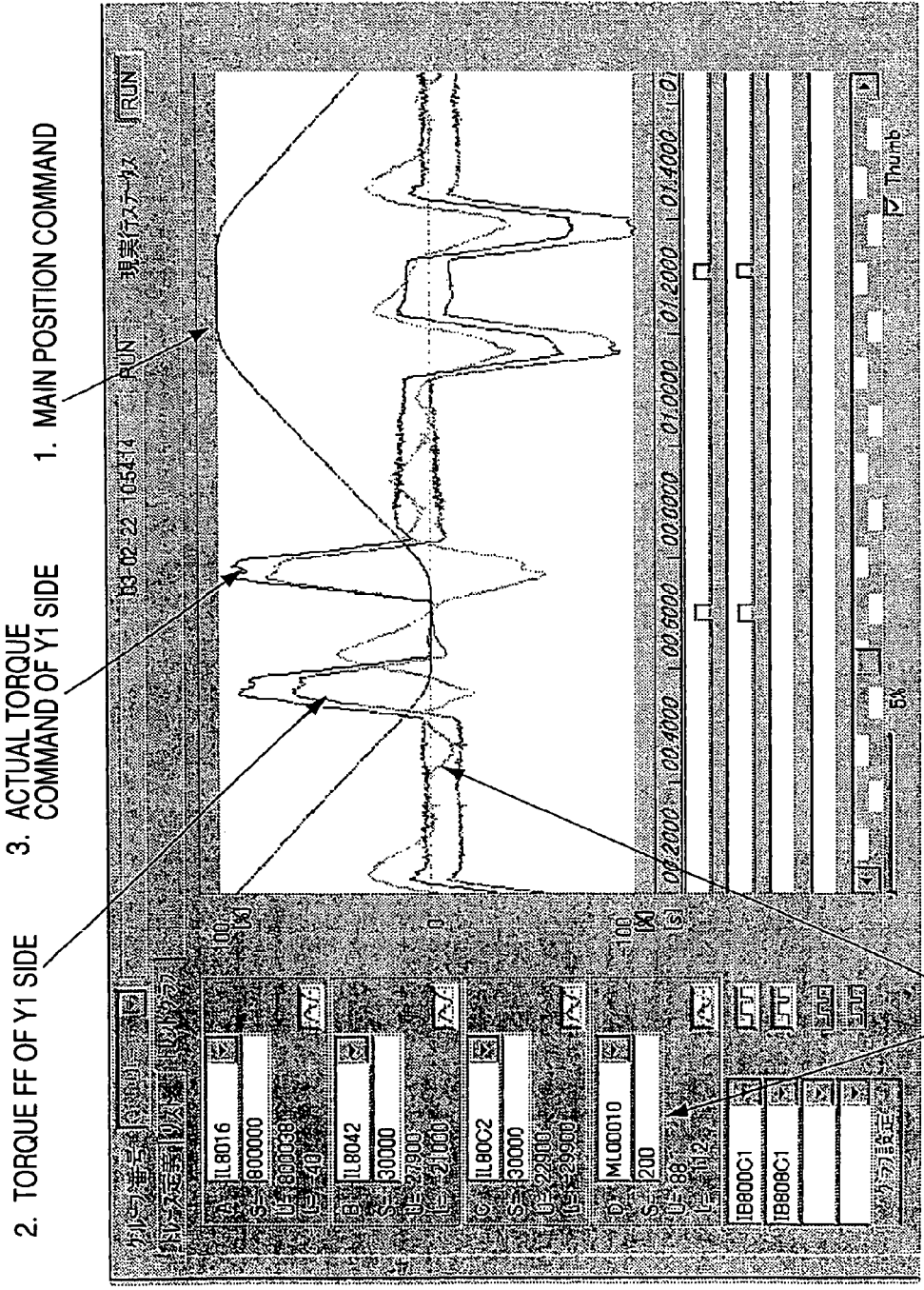
FIG. 9 is a diagram showing a relation between the main position command, the main torque command and the torque command in the correcting side when there is not an inertia correction control in the second embodiment of the present invention.
Figure 10:
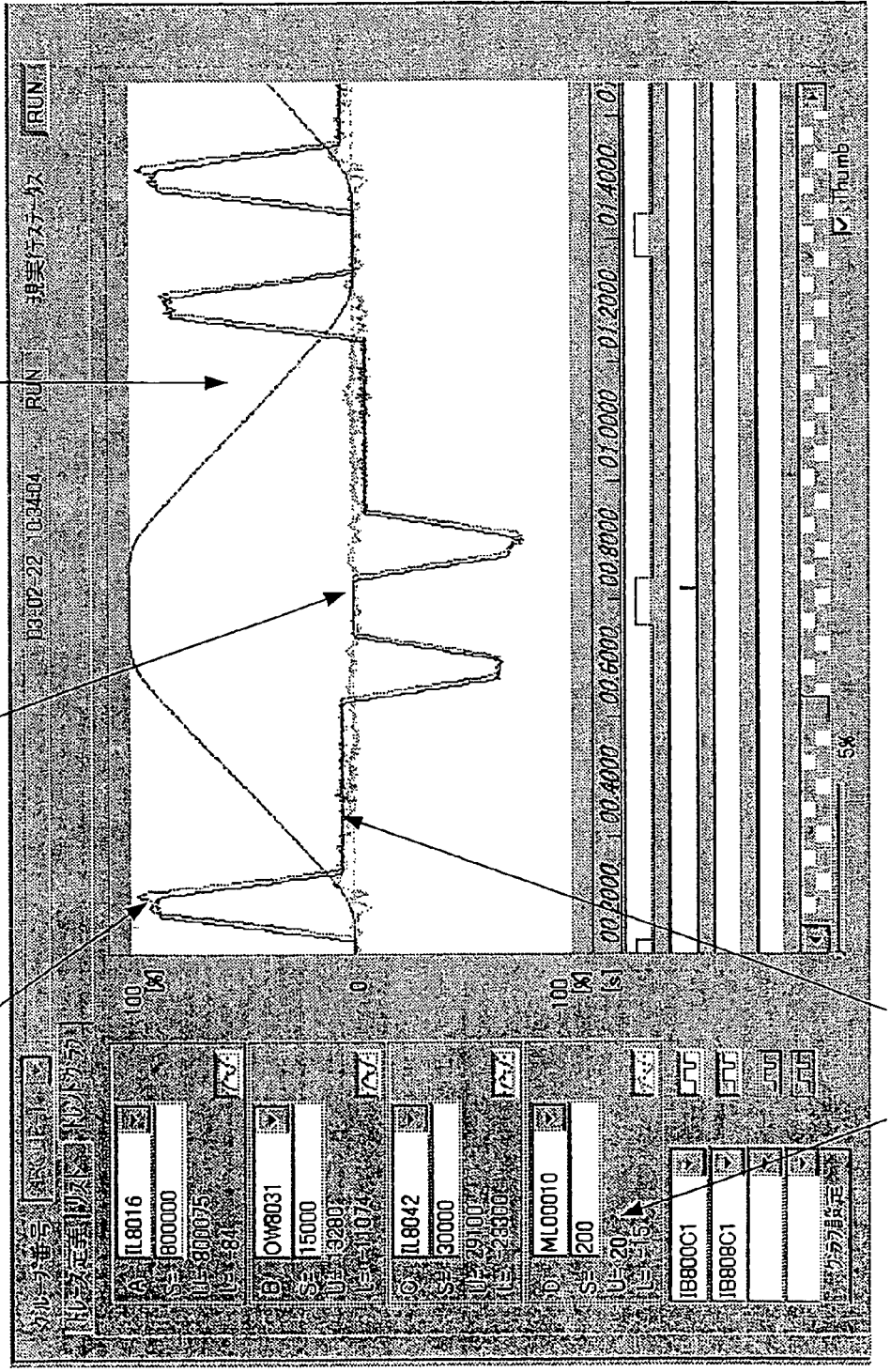
FIG. 10 is a diagram showing a relation between the main position command, the main torque command and the torque command in the correcting side when there is the inertia correction control in the second embodiment of the present invention.

FIGS. 9 and 10 show relations between the main position command, a main torque command and a torque command in a correcting side. FIG. 9 shows an example when a method of this embodiment is not used. FIG. 10 is an example when the method of this embodiment is used. In FIG. 9, when the X-axis is movable, a quantity of a torque FF of the Y1 does not correspond to an actually required torque command of the Y1, a deviation between the two axes is generated. In FIG. 10, since the quantity of the torque FF of the Y1 corresponds to the actually required torque command of the Y1 in accordance with the correction, it is understood that the deviation between the two axes is extremely improved as high as about ⅕.

INDUSTRIAL APPLICABILITY

As described above, according to the present invention, one of the two axes is operated at low speed by a position control and the other axis is allowed to freely run and follow the one axis and a return to the origin is performed. A positional deviation between the one axis and the other axis is measured at an arbitrary pitch and the positional deviation corresponding to a position where the one axis travels is stored in a data base as a function. One position command is directly distributed to the one axis as a main position command and the position command is distributed to the other axis as a position command corrected by using the function stored in the data base to perform an operation. Thus, a twin synchronization control that can realize a high speed and highly accurate operation can be easily realized.

Further, the position of a center of gravity of the fastening part is detected. A function for generating an inertia compensating gain of each axis is prepared by using a position signal thereof as an input. The inertia compensating gain is changed in the position of the center of gravity of the fastening part. A necessary torque calculated on the basis of an acceleration obtained from the position commands of the two axes and a mass of each axis is added to a torque command. Thus, since a quantity of the torque feed forward of one of the two axes corresponds to an actually required torque command, the deviation between the two axes can be extremely reduced.

The invention claimed is:

1. A control method for a twin synchronization in which two motors for driving two axes mechanically fastened to each other by a fastening part are synchronously operated, the control method comprising the steps of:
    operating one of the two axes at low speed by a position control and allowing the other axis to freely run and follow the one axis and perform a return to the origin;
    measuring a positional deviation between the one axis and the other axis at an arbitrary pitch;
    storing the positional deviation corresponding to a position where the one axis travels in a data base as a function;
    directly distributing one position command to the one axis as a main position command; and
    distributing the position command to the other axis as a position command corrected by using the function stored in the data base to perform an operation.

2. The control method for a twin synchronization according to claim 1, wherein
    the deviation measured at the arbitrary pitch undergoes a linear interpolating process in the function to output the obtained deviation.

3. The control method for a twin synchronization according to claim 1, wherein
    in the position command to the other axis, a travel speed is employed as a parameter to move forward the phase of a corrected value.

4. The control method for a twin synchronization according to claim 1, further comprising the steps of:
    detecting the position of a center of gravity of the fastening part;
    preparing a function for forming an inertia compensating gain of each axis by using a position signal as an input;
    changing the inertia compensating gain in the position of the center of gravity of the fastening part; and
    adding a necessary torque calculated on the basis of an acceleration obtained from the position commands of the two axes and a mass of each axis to a torque command.

* * * * *